(12) United States Patent
Song

(10) Patent No.: US 11,768,694 B2
(45) Date of Patent: Sep. 26, 2023

(54) CONTENT SHARING METHOD, DEVICE, TERMINAL AND STORAGE MEDIUM

(71) Applicant: GUANGDONG OPPO MOBILE TELECOMMUNICATIONS CORP., LTD., Guangdong (CN)

(72) Inventor: Fang Song, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/820,764

(22) Filed: Aug. 18, 2022

(65) Prior Publication Data

US 2022/0391232 A1 Dec. 8, 2022

Related U.S. Application Data

(63) Continuation of application No. PCT/CN2021/072735, filed on Jan. 19, 2021.

(30) Foreign Application Priority Data

Feb. 27, 2020 (CN) .......................... 202010124153.2

(51) Int. Cl.
  *G06F 3/0482* (2013.01)
  *G06F 9/451* (2018.01)
  *G06F 3/0484* (2022.01)

(52) U.S. Cl.
  CPC ............ *G06F 9/452* (2018.02); *G06F 3/0482* (2013.01); *G06F 3/0484* (2013.01); *G06F 2203/04803* (2013.01)

(58) Field of Classification Search
  None
  See application file for complete search history.

(56) References Cited

U.S. PATENT DOCUMENTS

2012/0159334 A1* 6/2012 Messerly ............... G06F 9/546
                                                  715/733
2013/0067027 A1* 3/2013 Song .................. H04N 1/00228
                                                  709/217

(Continued)

FOREIGN PATENT DOCUMENTS

CN         105740057 A        7/2016
CN         105955607 A        9/2016

(Continued)

OTHER PUBLICATIONS

CN106156254A (English Translation), Title: "Information sharing method and device" by Yixian, Guo, published on Nov. 23, 2016 (Year: 2016) (Year: 2016).*

(Continued)

*Primary Examiner* — Rinna Yi
(74) *Attorney, Agent, or Firm* — PERKINS COIE LLP

(57) ABSTRACT

A content sharing method includes: in response to a sharing trigger operation to a target content in a user interface, displaying a sharing trigger page in the user interface, wherein the sharing trigger page comprises at least one sharing entrance, and the sharing entrance is configured to invoke an application for content sharing; in response to a selection operation to the sharing entrance, determining n target sharing entrances, wherein n is an integer greater than or equal to 2; displaying n target sharing windows corresponding to the n target sharing entrances; in response to a sharing operation received in at least one of the n target sharing windows, sharing the target content to a target application. A terminal and a storage medium are further provided.

16 Claims, 9 Drawing Sheets

(56) References Cited

U.S. PATENT DOCUMENTS

| | | | | |
|---|---|---|---|---|
| 2013/0305163 A1* | 11/2013 | Farmer | ................... | G06F 9/54 |
| | | | | 715/748 |
| 2014/0181113 A1* | 6/2014 | Kim | ................... | G06F 16/168 |
| | | | | 707/740 |
| 2015/0143299 A1* | 5/2015 | Kim | ................... | G06F 3/0482 |
| | | | | 715/835 |
| 2016/0150063 A1* | 5/2016 | Choi | ................ | H04M 1/72403 |
| | | | | 455/414.1 |
| 2016/0359957 A1 | 12/2016 | Laliberte | | |
| 2017/0310888 A1* | 10/2017 | Wright | ................ | G06F 3/04817 |

FOREIGN PATENT DOCUMENTS

| | | |
|---|---|---|
| CN | 106156254 A | 11/2016 |
| CN | 109164964 A | 1/2019 |
| CN | 109327608 A | 2/2019 |
| CN | 109697008 A | 4/2019 |
| CN | 110673969 A | 1/2020 |
| EP | 2843536 A2 | 3/2015 |

OTHER PUBLICATIONS

First Office Action issued in corresponding CN Application No. 202010124153.2 dated Dec. 20, 2022. 20 pages with English translation.

WIPO, International Search Report and Written Opinion for International Application No. PCT/CN2021/072735, Apr. 15, 2021 with English translation (19 pages).

Extended European search report issued in corresponding European application No. 21760548.4 dated Jun. 29, 2023. (52 pages).

* cited by examiner

CONTENT SHARING METHOD, DEVICE, TERMINAL AND STORAGE MEDIUM

CROSS-REFERENCE TO RELATED APPLICATIONS

This application is a continuation of International Application No. PCT/CN2021/072735, filed on Jan. 19, 2021, which claims the benefit of priority to a Chinese patent application No. 202010124153.2, filed on Feb. 27, 2020, entitled "Content sharing method, device, terminal and storage medium", the contents of which are hereby incorporated by reference in their entireties.

TECHNICAL FIELD

Embodiments of the present application relates to the technical field of terminal, and in particularly, to a content sharing method, device, terminal and storage medium.

BACKGROUND

Content sharing refers to the process of sending content in a terminal from one application to another application through a sharing entrance. Generally, in the management interface of album or file of the terminal, the current interface could be jumped directly to the upload or sharing interface of another application by invoking the sharing entrance.

In a relevant art, after the user selects the content to be shared and clicks the sharing control, a plurality of optional applications to be shared will be displayed on the interface of the terminal. After the user selects one of the plurality of applications to be shared, the interface of the terminal will jump directly to the upload or sharing interface of the application to be shared, and the user could perform subsequent sharing operations in the upload or sharing interface.

For the content sharing method in the relevant art, if the content to be shared is to be shared to multiple applications to be shared, the above sharing steps need to be repeated multiple times, so the operation is relatively cumbersome.

SUMMARY

The embodiments of the present application provide a content sharing method, device, terminal, and storage medium. The technical solution is as follows.

On one hand, the embodiments of the present application provide a content sharing method, including the following operations.

In response to a sharing trigger operation to a target content in a user interface, a sharing trigger page is displayed in the user interface, wherein the sharing trigger page includes at least one sharing entrance that is configured to invoke an application for content sharing.

In response to a selection operation to the sharing entrance, n target sharing entrances are determined, wherein n is an integer greater than or equal to 2.

N target sharing windows are displayed corresponding to the n target sharing entrances.

In response to a sharing operation received in at least one of the n target sharing windows, the target content is shared to a target application.

On the other hand, the embodiments of the present application provide a content sharing device, including a first displaying module, a first determining module, a second displaying module and a sharing module.

The first displaying module is configured to display a sharing trigger page in a user interface in response to a sharing trigger operation to a target content in the user interface, wherein the sharing trigger page includes at least one sharing entrance that is configured to invoke an application for content sharing.

The first determining module is configured to determine n target sharing entrances in response to a selection operation to the sharing entrance, wherein n is an integer greater than or equal to 2.

The second displaying module is configured to display n target sharing windows corresponding to the n target sharing entrances.

The sharing module is configured to share the target content to a target application in response to a sharing operation received in at least one of the n target sharing windows.

In another aspect, the embodiments of the present application provide a terminal, including a processor and a memory. The memory is configured to store at least one instruction, and the at least one instruction is configured to be executed by the processor to implement the above-mentioned content sharing method.

In another aspect, a computer-readable storage medium is provided, and the storage medium is configured to store at least one instruction, and the at least one instruction is configured to be executed by a processor to implement the above-mentioned content sharing method.

In another aspect, the embodiments of the present application provide a computer program product or computer program. The computer program product or computer program includes computer instructions, and the computer instructions are stored in a computer-readable storage medium. A processor of the terminal reads the computer instructions from the computer-readable storage medium, and the processor executes the computer instructions, so that the terminal executes the content sharing method provided in the various above-mentioned optional implementations.

DETAILED DESCRIPTION

In order to make the objectives, technical solutions, and advantages of the present application clearer, the following further describes the embodiments of the present application in detail with reference to the accompanying drawings.

The "plurality" mentioned herein means two or more. "And/or" describes the association relationship of the associated objects, indicating that there can be three relationships, for example, A and/or B could mean: A alone, A and B existing at the same time, and B alone. The character "/" generally indicates an "or" relationship between the preceding and following associated objects.

Content sharing refers to the process of sending content in a terminal from one application to another application through a sharing entrance. For example, in the terminal's album and file management interface, by invoking the corresponding sharing entrance, the album interface (or file management interface) will directly jump to the upload or sharing interface of another application, and the user could perform corresponding operations in the upload or sharing interface to upload or share photos or files to another application.

Figure 1:
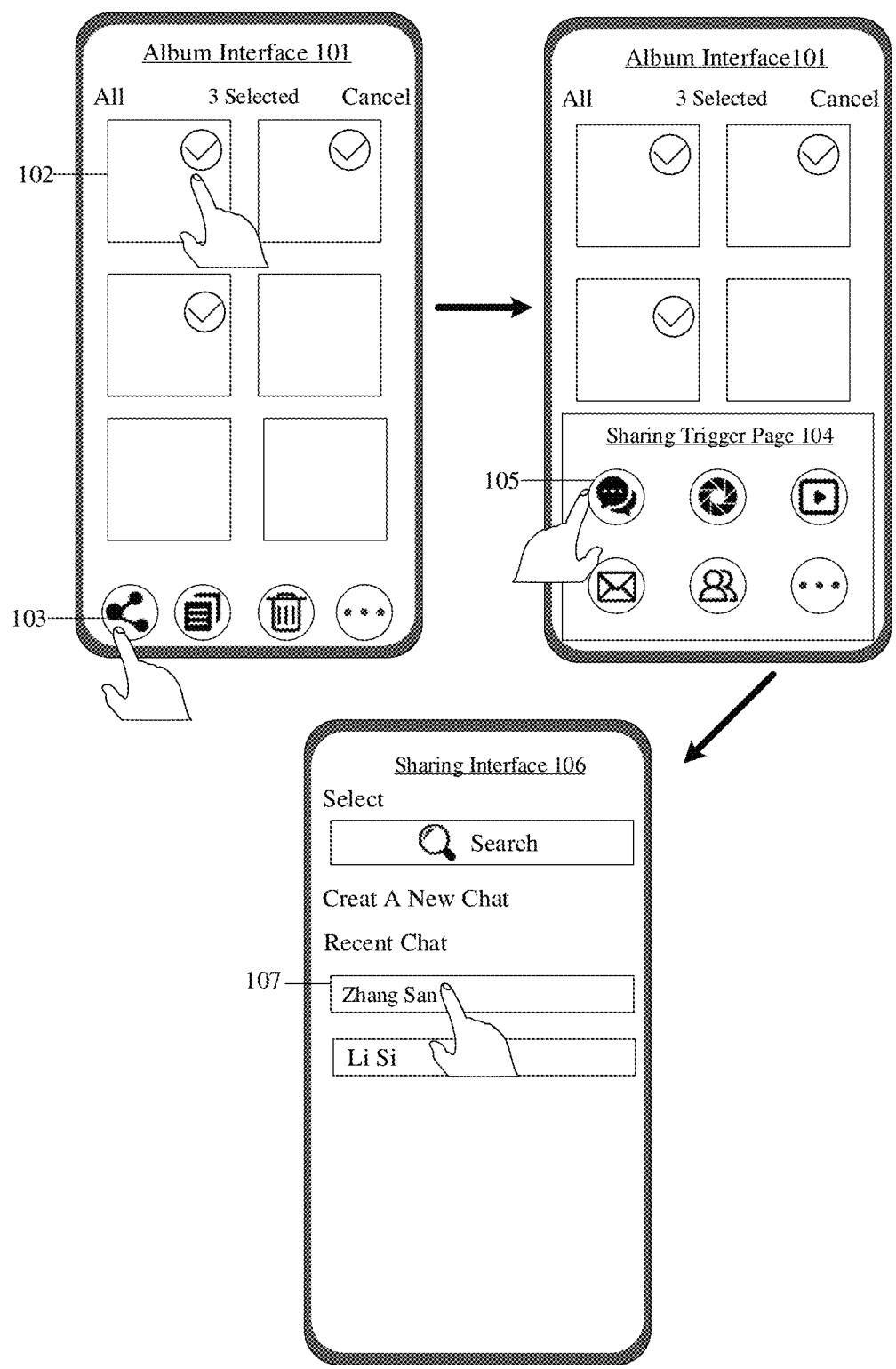
FIG. 1 shows a schematic diagram of content sharing in a relevant art.

In a relevant art, a content sharing method is provided. Illustratively, as shown in FIG. 1, when the user needs to share some photos in the album, the user needs to long-press a photo 102, meaning that the user selects the photo 102 for subsequent sharing operations (select all the photos to be shared according to the same operation, to select 3 photos as shown in FIG. 1). After the terminal receives the long-press operation to the photo 102, it will display a toolbar in an album interface 101. The toolbar displays optional operations for the selected photo, such as sharing operation, deleting operation, coping operation, etc. When the user clicks a sharing control 103, a sharing trigger page 104 will be displayed in the album interface 101, and multiple sharing entrances will be displayed in the sharing trigger page 104. Different sharing entrances may correspond to different sharing applications, or to different sharing interfaces of a same application, such as sharing to Moments, sending to a friend, etc. When the user clicks a sharing entrance 105, the terminal receives the clicking operation to the sharing entrance 105, and the terminal will directly invoke a sharing interface 106 corresponding to the sharing entrance 105. The user could perform the corresponding sharing operation in the sharing interface 106. For example, click a control 107 corresponding to "Zhang San", so as to select a friend to share, then directly share the selected photo to the friend "Zhang San".

In the content sharing method of the relevant art, when the user clicks on the sharing entrance, the interface will directly jump to the sharing interface corresponding to the sharing entrance. Therefore, the user could share the target content to only one application or a single sharing interface of one application. If the user needs to share the same content to multiple applications, or different sharing interfaces of the same application, for example, if the user needs to share a short video to a social platform, a short video platform and a social friend at the same time, the above sharing operation needs to be repeated three times, so the operation is relatively cumbersome, which reduces the efficiency of the sharing operation and causes a poor user experience.

Figure 2:
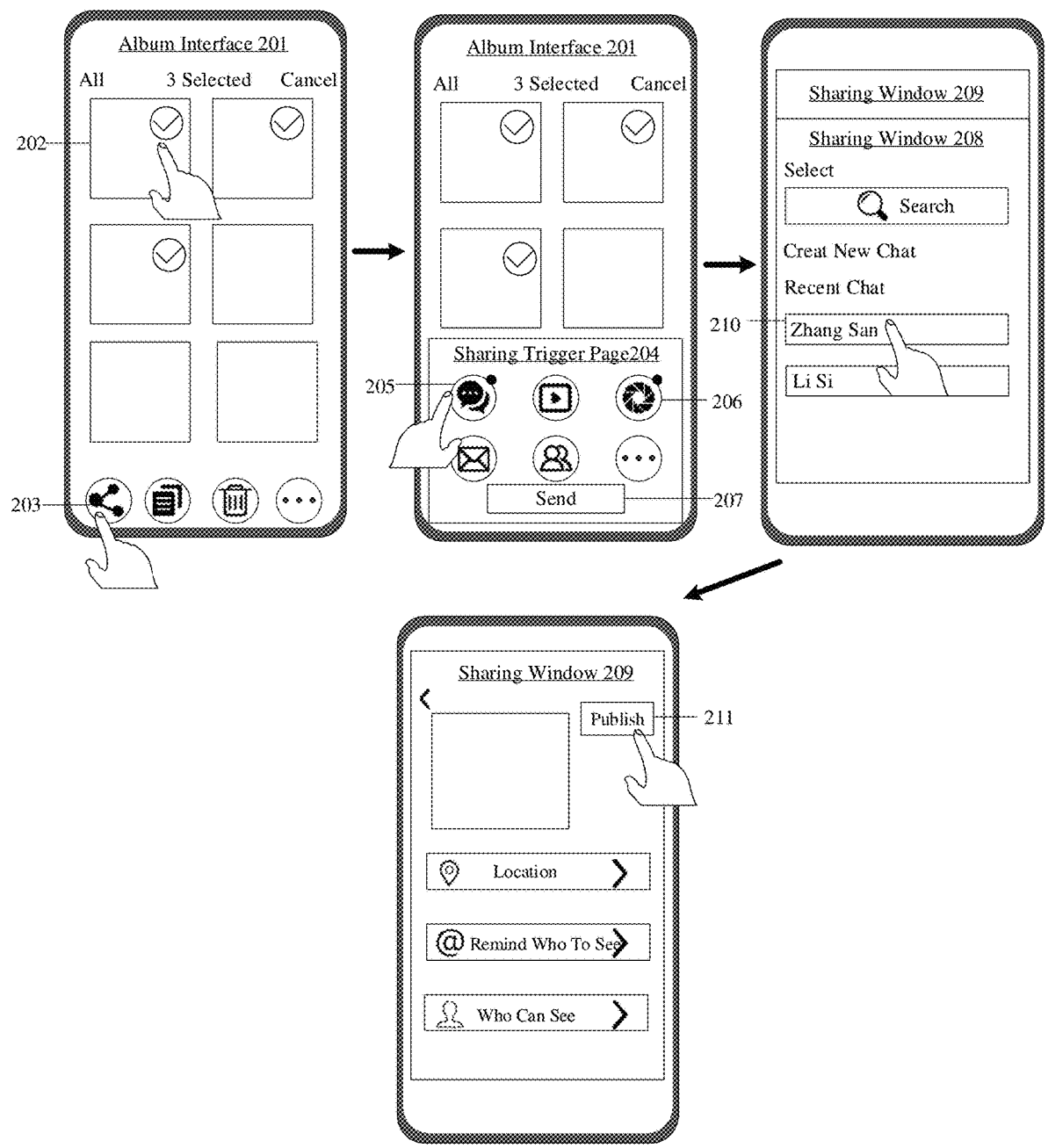
FIG. 2 is a schematic diagram of a content sharing process provided by an embodiment of the present application.

In order to solve the problem of cumbersome operation during the sharing process, an embodiment of the present application provides a content sharing method. Illustratively, as shown in FIG. 2, after the user long-presses a target picture 202 in an album interface 201, and clicks the sharing control 203, the terminal receives a sharing trigger operation to the target picture 202 in the album interface 201, then, a sharing trigger page 204 is displayed in the album interface 201. In the sharing trigger page 204, the user could click multiple sharing entrances at the same time, for example, the user clicks on a sharing entrance 205 and a sharing entrance 206, and clicks a sending control 207, and the terminal receives selection operations to the target entrances, then directly invokes a sharing window 208 corresponding to the sharing entrance 205 and a sharing window 209 corresponding to the sharing entrance 206. The user could perform sharing operations in the sharing window 208 to share the target picture 202 to a target application corresponding to the sharing window 208. For example, by selecting a control 210 corresponding to "Zhang San" in the sharing window 208, the user could share the target content to a friend "Zhang San". After the user completes the sharing operation in the sharing window 208, the sharing window 208 could be closed and the sharing window 209 could be displayed. The user can continue to perform a corresponding sharing operation in the sharing window 209, for example, the user could click a publishing control 211 in the sharing window 209, and then the target picture 202 can be shared to a target application corresponding to the sharing window 209. In this way, the target content can be shared to multiple applications at the same time. In the above content sharing process, when the terminal receives the sharing trigger operation to the target content in the user interface, it could display a sharing trigger page (the sharing trigger page includes at least one sharing entrance) in the user interface. The user could select multiple sharing entrances at the same time in the sharing trigger page. The terminal receives the selection operation to the sharing entrances, and determines n target sharing entrances, thereby displaying n target sharing windows corresponding to the n target sharing entrances, so that the user could perform corresponding sharing operation in each target sharing window, to share the target content to multiple target applications at the same time, or to share the target content to multiple application interfaces of one application at the same time. Compared with the relevant art, in which one single sharing trigger operation could share the target content to only one single application or only one single application interface, the content sharing method provided in the embodiments of the present application could simplify the process of sharing to multiple applications or multiple application interfaces and improve the efficiency of sharing operations.

Figure 3:
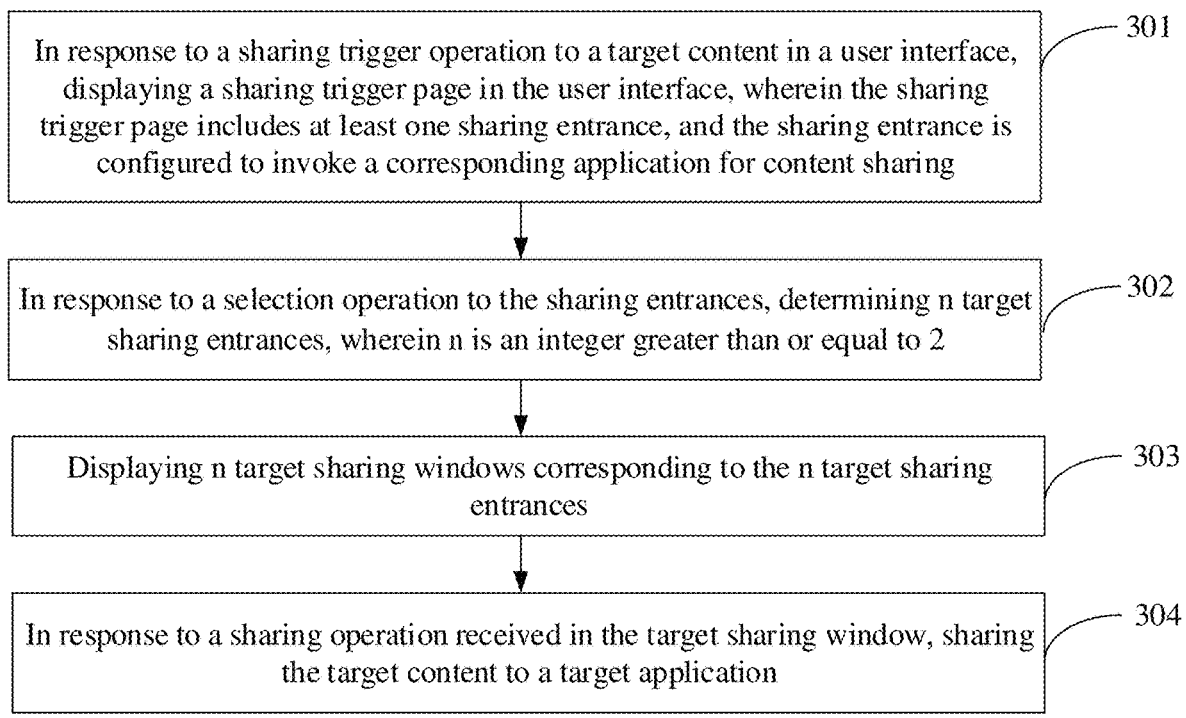
FIG. 3 shows a flowchart of a content sharing method in an embodiment of the present application.

Please refer to FIG. 3, which shows a flowchart of a content sharing method in an embodiment of the present application. The embodiment of the present application takes the method be applied to a terminal as an example for description, and the method includes the following operations.

At block 301, in response to a sharing trigger operation to a target content in a user interface, a sharing trigger page is displayed in the user interface, wherein the sharing trigger page includes at least one sharing entrance, and the sharing entrance is configured to invoke a corresponding application for content sharing.

Wherein, the user interface is an interface that could trigger a sharing operation, which could be a content management interface such as an album interface, a file management interface, or other interface such as a video playback interface, a game interface, an audio playback interface, an instant messaging interface, a reading interface, etc., The embodiments of the present application do not limit the user interface. Illustratively, corresponding to the user interface, the target content in the user interface may be a picture (for example, photo, screenshot), document, text, video, audio, chat content, etc. The embodiments of the present application do not limit the target content.

Regarding the sharing trigger operation, in a possible implementation manner, a sharing control is set in the user interface. After the user selects the target content in the user interface, the user could click the sharing control in the user interface, and after the terminal receives the sharing trigger operation, the terminal will display the sharing trigger page in the user interface, and the sharing trigger page includes various sharing entrances corresponding to various applications, so that the user could select the application to which the target content is shared in the sharing trigger page.

In some embodiments, the sharing trigger operation may be a click operation, a long-press operation, a double-click operation, etc. The embodiments of the present application do not limit the type of the sharing trigger operation.

Different sharing entrances could correspond to different applications. When a sharing entrance is triggered, a sharing interface corresponding to an application is invoked. In some embodiments, different sharing entrances could also correspond to the same one application, but correspond to different functional interfaces of the same one application. When a sharing entrance is triggered, although one application is invoked, but different functional interfaces of the application are invoked. For example, both of the sharing entrance sharing to a friend and the sharing entrance sharing to Moments correspond to the same application A, but they correspond to different sharing interfaces of the application A.

Schematically, as shown in FIG. 2, when the user clicks on the share control 203, the terminal receives the sharing trigger operation to the target picture 202 in the album interface 201, then the terminal displays the sharing trigger page 204 in the album interface 201, and multiple sharing entrances are shown in the sharing trigger page 204.

In some embodiments, the sharing trigger page corresponding to different user interfaces may be different, mainly because the sharing entrance displayed in the sharing trigger page may be different. The user could customize the sharing trigger page corresponding to each user interface. For example, set the commonly used sharing entrance in the user interface in the sharing trigger page; or the terminal could set the sharing trigger page according to the user's trigger frequency to the sharing entrance in the user interface. For example, display the sharing entrance with a higher trigger frequency in the user interface in the sharing trigger page.

At block 302, in response to a selection operation to the sharing entrances, n target sharing entrances are determined, wherein n is an integer greater than or equal to 2.

In a possible implementation manner, the user could select the application to be shared in the sharing trigger page, that is, select the corresponding sharing entrance. When the terminal receives the selection operation to the sharing entrance, it will determine the sharing entrance as the target sharing entrance.

The selection operation may be a click operation, a long-press operation, etc. The embodiments of the present application do not limit the type of the selection operation.

Different from the content sharing method in a relevant art, when the user clicks on a sharing entrance, the terminal receives the click operation to the sharing entrance, and the interface of the terminal will directly jump to the application sharing page corresponding to the sharing entrance. In the embodiments of the application, the user could select at least 2 target sharing entrances in the sharing trigger page, and the terminal will not directly perform the jumping operation if any one of the sharing entrances is selected.

In some embodiments, the user could also select one sharing entrance on the sharing touch page.

Schematically, as shown in FIG. 2, when the user clicks on the sharing entrance 205 and the sharing entrance 206, the terminal receives the selection operation to the sharing entrance 205 and the sharing entrance 206, then the terminal determines the sharing entrance 205 and the sharing entrance 206 as the target sharing entrance, and when the user clicks on the sharing entrance 205 or the sharing entrance 206, the terminal will not directly jump to the sharing interface corresponding to the sharing entrance 205 or the sharing entrance 206.

At block 303, n target sharing windows is displayed corresponding to the n target sharing entrances.

In a possible implementation manner, there is a sending control in the sharing touch page. After selecting n target sharing entrances, the user could click the sending control in the sharing touch page. The terminal receives the click operation to the sending control, and confirms that the user has finished the selection to the sharing entrance for the sharing operation, and then could invoke multiple target applications corresponding to the n target sharing entrances, and display n target sharing windows corresponding to the n sharing entrances in the current interface.

Different from the relevant art, in which one sharing operation could invoke only one single target application or only one single application interface, the embodiments of the present application could invoke n target applications corresponding to the n target entrances at the same time and display n target sharing windows corresponding to the n target applications if n target entrances correspond to different applications, or if n target entrances correspond to different functional interfaces of one application, the embodiments of the present application could invoke n target sharing windows corresponding to the application at the same time, and different sharing interfaces are displayed in the different sharing windows.

Schematically, as shown in FIG. 2, after the user clicks the sending control 207 in the sharing trigger page 204, the terminal receives the trigger operation to the sending control 207, and will display the target sharing windows respectively corresponding to the sharing entrance 205 and the sharing entrance 206, that is, the sharing window 208 and the sharing window 209.

At block 304, in response to a sharing operation received in the target sharing window, the target content is shared to a target application.

In a possible implementation manner, the user could perform sharing operation in each target sharing window, such as editing the shared text, selecting a friend to share, etc., so that, by one single sharing trigger operation, the same batch of target content could be shared to multiple target applications.

Schematically, as shown in FIG. 2, the user could click the control 210 corresponding to "Zhang San" in the sharing window 208, and then share the target picture 202 to the friend "Zhang San", and correspondingly, after the user completes the sharing operation in the sharing window 208, the sharing window 208 could be closed, and the user could enter the sharing window 209 to perform the sharing operation, to share the target picture to multiple target applications.

In summary, in the embodiments of the present application, when the terminal receives a sharing trigger operation to the target content in the user interface, the terminal could display a sharing trigger page (the sharing trigger page includes at least one sharing entrance) in the user interface; the user could select multiple sharing entrances at the same time in the sharing trigger page, and the terminal receives the selection operation to the sharing entrances, and could determine n target sharing entrances, thereby displaying n target sharing windows corresponding to the n target sharing entrances, so that the user could perform sharing operation in each target sharing window, thereby sharing the target content to multiple target applications at the same time. Since the user could select multiple target sharing entrances in the sharing trigger page at the same time, and the terminal could invoke the target sharing windows corresponding to multiple target sharing entrances at the same time, therefore, the same target content could be shared to multiple target applications by one single sharing trigger operation. Compared with the relevant art, in which the target content could be shared only one single target application by one single sharing trigger operation, the content sharing method provided in the embodiments of the present application could simplify the sharing operation process, improve the efficiency of the sharing operation, and thereby improving the user's sharing experience.

In some embodiments, that the n target sharing windows are displayed corresponding to the n target sharing entrances includes the following operations.

One or more target applications are determined corresponding to each of the n target sharing entrances, wherein different sharing entrances correspond to different applications or to different sharing interfaces of a same application.

The target applications are invoked, and n sharing interfaces are displayed corresponding to the n target sharing entrances in the n target sharing windows, wherein a display mode of the n target sharing windows comprises a tiled display or a stacked display.

In some embodiment, the n target sharing windows are displayed in a stack form, and the peripheral side of the target sharing window comprises a jump control.

That the target content is shared to a target application includes the following operations.

In response to a k-th sharing operation in a k-th target sharing window, the target content is shared to a k-th target application, wherein k is an integer greater than or equal to 1 and less than or equal to n−1.

A callback application interface is obtained corresponding to the k-th target application, wherein the callback application interface is configured to indicate an application interface that the k-th target application calls back after the content sharing for the k-th target application is completed.

In response to the callback application interface being the user interface, the k-th target sharing window is automatically closed, and the k+1-th target sharing window is displayed.

In response to the callback application interface being an application interface corresponding to the k-th target application, the callback application interface is displayed in the k-th target window; in response to a trigger operation to the jump control, the k-th target sharing window is closed, and the k+1-th target sharing window is displayed.

In some embodiments, after the target content is shared to a target application in response to a sharing operation received in at least one of the n target sharing windows, the method further includes the following operations.

In response to sharing the target content to an n-th target application, an n-th target sharing window is automatically closed, and a sharing end interface is displayed, wherein the sharing end interface comprises a completion control.

In response to a trigger operation to the completion control, the sharing end interface is stopped displaying, and the user interface is displayed.

In some embodiments, the sharing trigger page includes a multi-application sharing entry control.

Before the n target sharing entrances is determined in response to a first selection operation to the sharing entrance, the method further includes the following operations.

In response to a trigger operation to the multi-application sharing entry control in the sharing trigger page, a single-application sharing function is switched to a multi-application sharing function.

In some embodiments, that the target applications are invoked and the n sharing interfaces are displayed includes the following operations.

A number of the target sharing entrances is obtained.

In response to the number being more than an upper limit of a sharing number, the n target sharing entrances are divided into a first target sharing entrance and a second target sharing entrance according to the upper limit of the sharing number, wherein both of the number of the first target sharing entrance and the number of the second target sharing entrance are less than the upper limit of the sharing number.

A target application corresponding to the first target sharing entrance is invoked, and a sharing interface corresponding to the first target sharing entrance is displayed in a target sharing window.

In response to sharing the target content to the target application corresponding to the first target sharing entrance, a target application corresponding to the second target sharing entrance is invoked, and a sharing interface corresponding to the second target sharing entrance is displayed in a target sharing window.

In some embodiments, the method further includes the following operations.

A current remaining memory space is obtained.

The upper limit of the sharing number according to the current remaining memory space is determined, wherein the upper limit of the sharing number is positively correlated with the current remaining memory space.

In some embodiments, wherein the method further includes the following operations.

A data amount of the target content is obtained.

In response to the data amount being more than a data amount threshold, the sharing operation in the n target sharing windows is simultaneously received.

In some embodiments, wherein after the displaying n target sharing windows corresponding to the n target sharing entrances, the method further includes the following operations.

A timer for the n target sharing windows is set.

In response to the timer reaching a timer duration and not receiving the sharing operation in the n target sharing windows, the n target sharing windows are closed.

In a possible implementation manner, in order to meet the operating needs of different users, the terminal could set two sharing trigger pages, one is for single application sharing, that's, the terminal will immediately jump to the sharing interface corresponding to the sharing entrance after the user clicks the sharing entrance in the sharing trigger page; one is for multi-application sharing, that is, the user could select multiple sharing entrances at the same time. The user could perform corresponding operation in the sharing trigger page to realize the switching between two sharing trigger pages and the sharing manners corresponding to the two sharing trigger pages.

Figure 4:
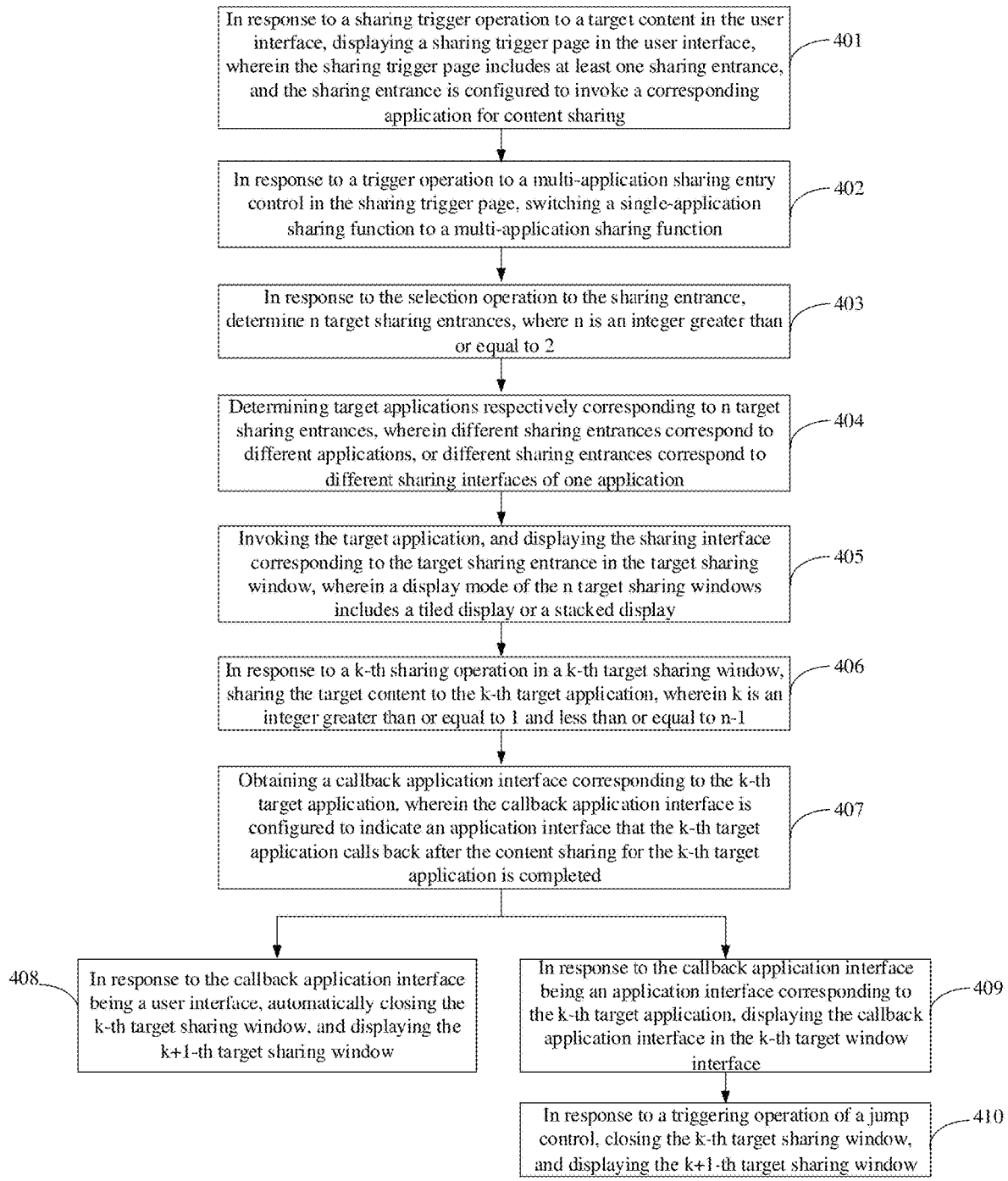
FIG. 4 shows a flowchart of a content sharing method in another embodiment of the present application.

Please refer to FIG. 4, which shows a flowchart of a content sharing method in another embodiment of the present application. The embodiment of the present application takes the method applied to a terminal as an example for description, and the method includes:

At block 401, in response to a sharing trigger operation to a target content in the user interface, a sharing trigger page in the user interface is displayed, wherein the sharing trigger page includes at least one sharing entrance, and the sharing entrance is configured to invoke a corresponding application for content sharing.

One could refer to the block 301 for the implementation of the block 401, which will not be repeated in this embodiment.

At block 402, in response to a trigger operation to a multi-application sharing entry control in the sharing trigger page, a single-application sharing function is switched to a multi-application sharing function.

Wherein, the sharing trigger page is provided with a multi-application sharing entry control, and triggering the multi-application sharing entry control could switch the single-application sharing function of the sharing trigger page to the multi-application sharing function.

For the single-application sharing function, it indicates that, in the sharing trigger page with the single-application sharing function, when the user clicks on any one of the sharing entrances, the terminal receives the trigger operation to any one of the sharing entrances, and then, the terminal will directly jump to the sharing interface corresponding to the sharing entrance.

For the multi-application sharing function, it indicates that, in the sharing trigger page with the multi-application sharing function, when the user clicks on any one of the sharing entrances and clicks the sharing sending (confirmation) control, the terminal receives the trigger operation to any one of the sharing entrances and receives the sharing confirmation operation, and then the terminal will jump to the sharing interface corresponding to the sharing entrance, so as to realize the function of selecting multiple sharing entrances.

In a possible implementation manner, when the terminal receives the sharing trigger operation to the target content in the user interface, it will firstly display the sharing trigger page of the single-application sharing function in the user interface, and the sharing trigger page could only realize sharing the target content to one single application. If the user needs to perform the multiple-application sharing, the user could click the multi-application sharing entry control in the sharing trigger page. When the terminal receives the trigger operation of the multi-application sharing entry control, it could switch the sharing trigger page from the single application sharing function to the multi-application sharing function.

Figure 5:
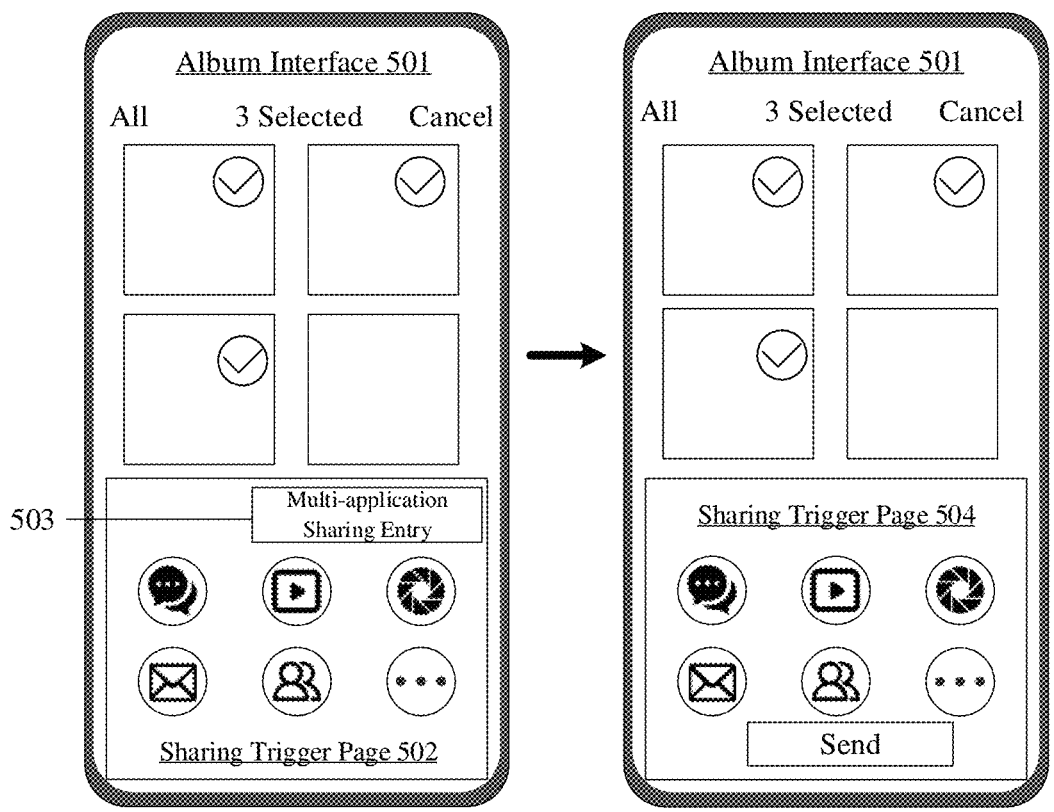
FIG. 5 is a schematic diagram of switching the sharing trigger interfaces in an embodiment of the present application.

Schematically, as shown in FIG. 5, after the user clicks on the sharing control, a sharing trigger page 502 is firstly displayed in the album interface 501. The sharing trigger page 502 is provided with a multi-application sharing entry 503, that is, the sharing trigger page 502 only has a single-application sharing function. Therefore, if the user needs to perform a multiple-application sharing, the user could click the multi-application sharing entry 503. After the terminal receives a click operation to the multi-application sharing entry 503, it could switch and display the sharing trigger page 504 which could receive click operations to multiple sharing entrances.

In some embodiments, when the terminal receives a sharing trigger operation to the target content in the user interface, it could also firstly display a sharing trigger page with a multi-application sharing function in the user interface, and the sharing trigger page displays a single-application sharing entry. If the user needs to perform a single-application sharing, the user could click the single-application sharing entry in the sharing trigger page. After the terminal receives a click operation to the single-application sharing entry, it could switch and display the sharing trigger page with the single-application sharing function.

At block 403, in response to the selection operation to the sharing entrance, n target sharing entrances are determined, wherein n is an integer greater than or equal to 2.

One could refer to block 302 for the implementation of the block 403, which is not repeated in this embodiment.

At block 404, one or more target applications respectively corresponding to n target sharing entrances are determined, wherein different sharing entrances correspond to different applications, or different sharing entrances correspond to different sharing interfaces of one application.

Since the content sharing operation generally need to be executed across applications, that is, the target content of application A needs to be shared to other applications except application A, therefore, in the process of invoking the target sharing window corresponding to the target sharing entrance, the terminal needs to firstly start the application corresponding to the target sharing entrance, thereby determining the target sharing interface corresponding to the target sharing entrance.

If different sharing entrances correspond to different applications, when n sharing entrances are determined based on the user's selection operation, n applications could be determined based on the n sharing entrances. If at least two sharing entrances of the n sharing entrances correspond to different sharing interfaces of one application, m applications could be determined based on the n sharing entrances, wherein m is an integer less than n.

In a possible implementation manner, when the terminal invokes the target sharing window corresponding to each sharing entrance, since different applications correspond to different target sharing windows, the terminal firstly needs to determine the target applications corresponding to the n target sharing entrances, so as to subsequently invoke the target application, and thus further display the target sharing window corresponding to the target application.

At block 405, the target application is invoked, and the sharing interface corresponding to the target sharing entrance is displayed in the target sharing window, wherein a display mode of the n target sharing windows includes a tiled display or a stacked display.

In a possible implementation manner, when determining n target applications, the terminal could invoke the target application, and display the sharing interface corresponding to each target sharing entrance in the corresponding sharing window. Wherein, different sharing windows display different sharing interfaces.

Since the user could not perform operations in multiple sharing windows at the same time, and the user interface of the terminal is limited, in order to make it easier for the user to perform sharing operation, each sharing window could be displayed in a stacked form, that is, after the user completes the sharing operation in a previous sharing interface, the previous sharing interface could be closed and the user could enter the next sharing interface to continue the sharing operation.

In some embodiments, when the sharing windows are displayed in a stacked form, the display order of the sharing windows could be randomly determined. Or, the display order of the sharing windows could be according to the user's selection order of the sharing entrances, that is, the higher the selection order, the higher the sharing window corresponding to the sharing entrance will be displayed. For example, if the user firstly selects the sharing entrance A, the sharing window corresponding to the sharing entrance A will be displayed on the top level of the user interface when the sharing windows are displayed in a stacked form, so as to facilitate the priority operation of the user to the sharing interface corresponding to the sharing entrance. Or, the display order of the sharing windows could be determined according to the order of invoking different applications by the terminal, and if an application is started first, the sharing window corresponding to the application is displayed first.

In some embodiments, when different sharing windows are displayed in a stacked form, the user does not need to perform the sharing operations as the displaying order of the sharing windows, that is, the user could close the sharing window at the top level and enter the next sharing window, or switch the displaying order of the sharing windows.

In some embodiments, different sharing windows could also be displayed in a tiled form. By dividing the display screen into different display interfaces, different sharing windows are displayed in different display interfaces (similar to the process of split-screen display). Since the tiled display has a certain requirement to the size of the display screen, if the display screen is small, the display interface of each sharing window will be small, which will affect the normal sharing operation of the user. Therefore, in a possible implementation manner, the tiled display mode is more suitable for the terminal with a large display screen. The embodiments of the present application do not limit the display form of each sharing window.

Figure 6:
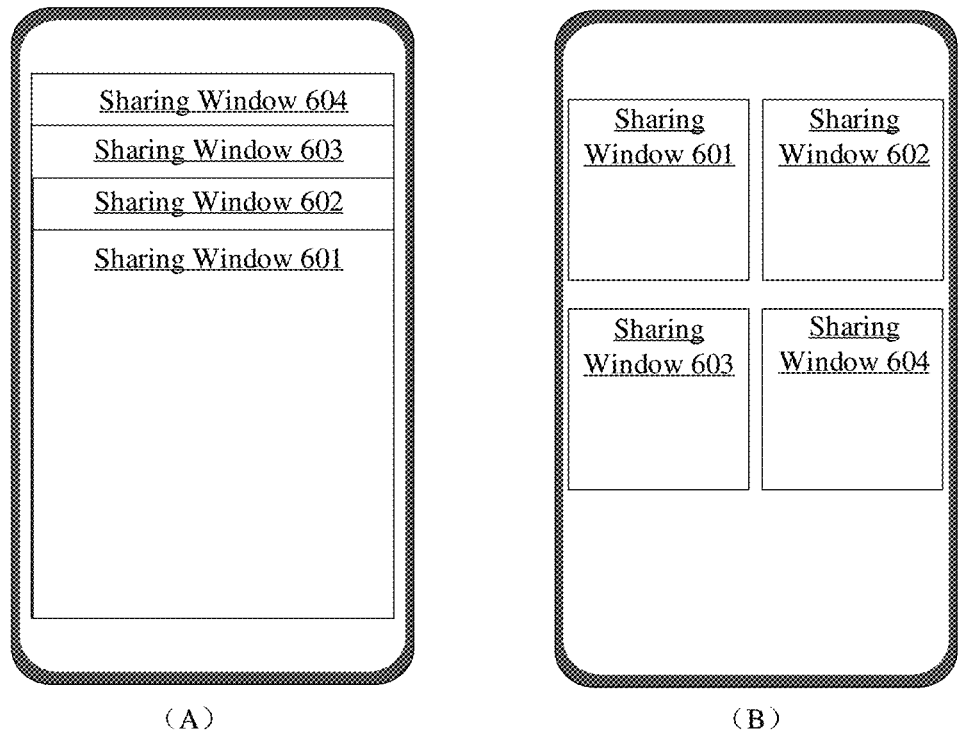
FIG. 6 is a schematic diagram of a display form of a target sharing window in an embodiment of the present application.

Schematically, as shown in FIG. 6 is a schematic diagram of the display form of the target sharing windows in an embodiment of the present application. FIG. 6(A) shows the display form of a stacked display, that is, the sharing window 601, the sharing window 602, the sharing window 603, and the sharing window 604 are displayed in a stack form. FIG. 6(B) shows the display form of a tiled display, that is, the sharing window 601, the sharing window 602, the sharing window 603, and the sharing window 604 are displayed in a tile form.

At block 406, in response to a k-th sharing operation in a k-th target sharing window, the target content is shared to the k-th target application, wherein k is an integer greater than or equal to 1 and less than or equal to n−1.

In a possible implementation manner, when the user performs the k-th sharing operation in the k-th target sharing window interface, the terminal receives the k-th sharing operation in the k-th target sharing window, and then, the target content could be shared to the k-th target application corresponding to the k-th target sharing window interface.

In an illustrative example, if n is equal to 4, that is, the target sharing window includes 4 sharing windows. If k is equal to 3, that is, the user performs a sharing operation in the third target sharing window, and correspondingly, the target sharing content could be shared to the target application corresponding to the third target sharing window.

Figure 7:
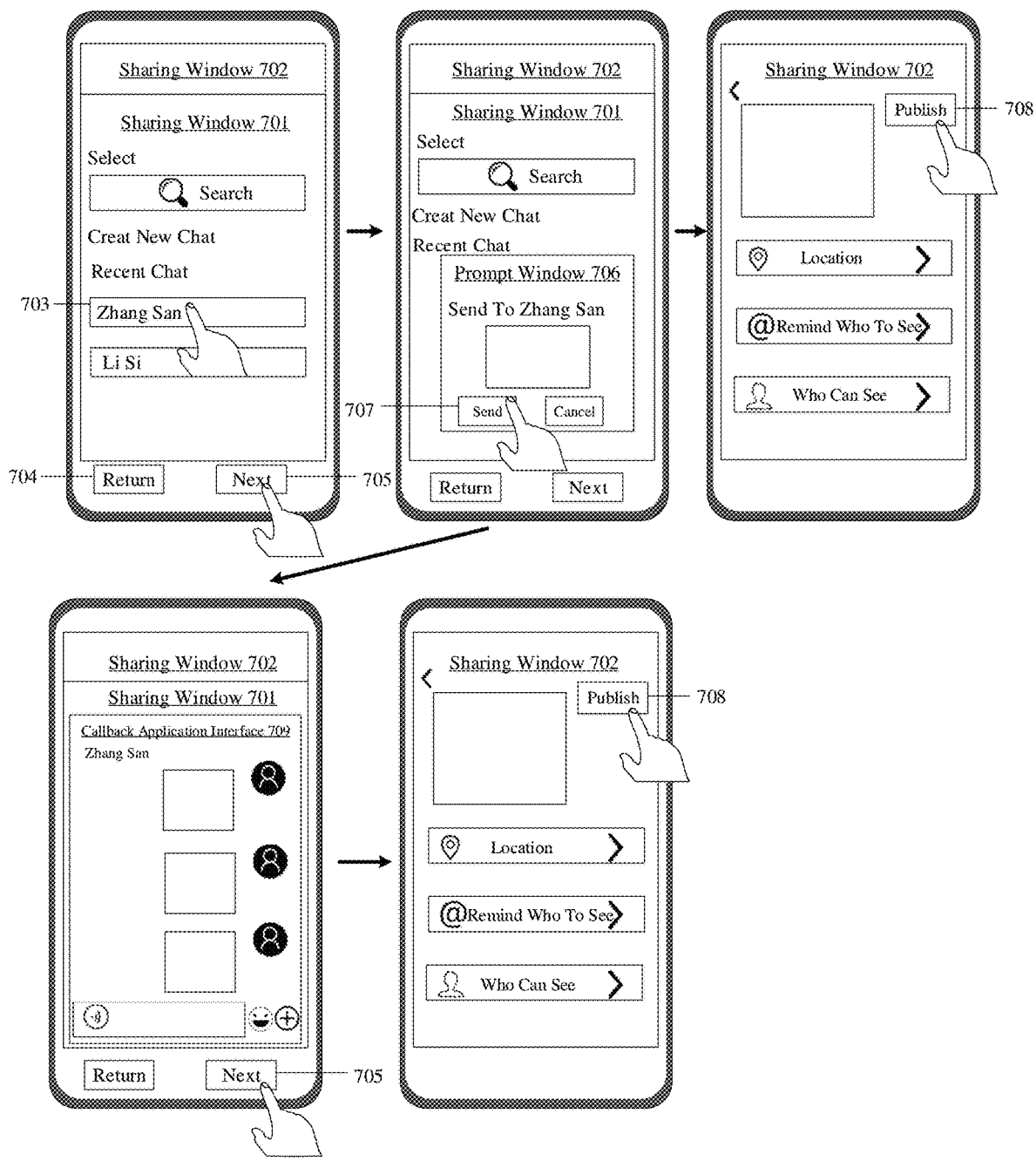
FIG. 7 is a schematic diagram of a content sharing process provided by an embodiment of the present application.

Schematically, as shown in FIG. 7, when the terminal displays a sharing window 701 and a sharing window 702 in a stack, the user could perform a sharing operation in the sharing window 701. For example, the user clicks the control 703 corresponding to "Zhang San", and the terminal receives the click operation to the control 703, and then displays a prompt window 706 in the sharing window 701, and the user could click a sending control 707 in the prompt window 706 to send the target content to the friend "Zhang San".

At block 407, a callback application interface corresponding to the k-th target application is obtained, wherein the callback application interface is configured to indicate an application interface that the k-th target application calls back after the content sharing for the k-th target application is completed.

After the user completes the sharing operation in the target sharing window, the target application may have a callback behavior, and the callback behaviors corresponding to different types of applications are different. For example, when application A calls back, the interface will return to the original sharing interface (that's a user interface); when application B calls back, the interface will return to the application interface corresponding to application B. In order to facilitate subsequent sharing operations in other target sharing windows, in a possible implementation manner, the terminal needs to obtain the callback application interface corresponding to each target application, so as to take different operations according to different callback application interfaces.

For example, if n is 3 and k is 1, then obtain the callback application interface corresponding to the first target application.

At block 408, in response to the callback application interface being a user interface, the k-th target sharing window is automatically closed, and the k+1-th target sharing window is displayed.

In a possible implementation manner, if the terminal identifies that the callback application interface corresponding to the k-th target application is a user interface, for the smooth execution of the subsequent sharing operations, the terminal intercepts the callback behavior corresponding to the k-th target application, closes the target sharing window corresponding to the k-th target application, and automatically enter the k+1-th target sharing window, so that the user could continue to perform sharing operation in the k+1-th target sharing window.

Schematically, as shown in FIG. 7, if the sharing window 701 corresponds to the target application A, the callback application interface corresponding to the target application A is the user interface, and the terminal intercepts the callback behavior corresponding to the target application A, directly closes the sharing window 701, and enters the sharing window 702. The user can continue the sharing operation in the sharing window 702, for example, click on the publish control 708, then to share the target content to the target application B corresponding to the sharing window 702.

At block 409, in response to the callback application interface being an application interface corresponding to the k-th target application, the callback application interface is displayed in the k-th target window interface.

In a possible implementation manner, if the terminal identifies that the callback application interface corresponding to the k-th target application is the application interface corresponding to the k-th target application, the terminal will continue to display the callback application interface, and if the user needs to perform subsequent sharing operation, the user needs to manually perform the corresponding operation to enter the next sharing window.

Illustratively, as shown in FIG. 7, if the terminal identifies that the callback application interface corresponding to the k-th target application is the application interface corresponding to the k-th target application, the terminal displays the callback application interface 709 in the sharing window 701.

In some embodiments, in order to improve the convenience of user operations, when the terminal determines that the callback application interface is the application interface corresponding to the target application, the terminal intercepts the callback behavior and directly enter the next sharing window, avoiding that the user needs to manually close the application interface and then enters the operation of the next sharing window, further improving the convenience of the sharing process.

At block 410, in response to a trigger operation of a jump control, the k-th target sharing window is closed, and the k+1-th target sharing window is displayed.

Wherein, a jump control is set on the side of the target sharing window interface, and the jump control is configured to return to the previous interface and enter the next interface.

In a possible implementation manner, the user could click the jump control set in the sharing window interface, then the terminal could close the current target sharing window and enter the next target sharing window.

Illustratively, the jump control is displayed outside the sharing window interface, such as the return control 704 and the continuing control 705. When the callback application interface 709 is continuously displayed in the sharing window 701, the user can click the continuing control 705, and the terminal receives the touch operation to the jump control, and then closes the sharing window 701 and enters the sharing window 702. When the user clicks the return control in the sharing window 701, since the previous interface of the sharing window 701 is the sharing trigger page, correspondingly, when the user clicks the return control 704, the terminal could return to the user interface before sharing.

In the embodiment, the terminal determines the target application corresponding to the target sharing entrance to invoke the target application, and displays the sharing interface corresponding to the target sharing entrance in the target sharing window. In addition, when the target windows are displayed in a stack form, a jump control is set at the side of the target sharing window. When the obtained callback application interface is the application interface corresponding to the target application, the user can manually click the jump control to close the current sharing window, enter the next sharing window, and continue the sharing operation.

In a possible implementation manner, when the user completes the corresponding sharing operation in each sharing window, that is, after sharing the target content to the target application, in order to prompt the user that the sharing operation is completed, in a possible implementation manner, after the terminal identifies the end of the sharing operation, the terminal will display the sharing end interface to remind the user that the sharing is completed and subsequent operations could be performed.

Figure 8:
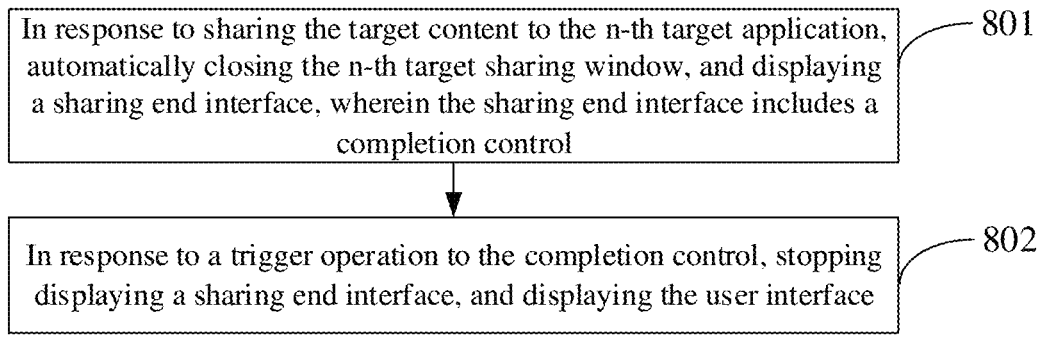
FIG. 8 is a flowchart of returning to a user interface after sharing is completed in an embodiment of the present application.

Schematically, as shown in FIG. 8, it shows a flowchart of returning to a user interface after sharing in an embodiment of the present application, and the method includes:

At block 801, in response to sharing the target content to the n-th target application, the n-th target sharing window is automatically closed, and a sharing end interface is displayed, wherein the sharing end interface includes a completion control.

In a possible implementation manner, after the user completes the sharing operation in each sharing window, that is, after the terminal identifies that the target content has been shared to the n-th target application, the terminal will automatically close the n-th target sharing window and display the sharing end interface. The sharing end interface is used to remind the user the completion of the sharing, and the user could return to the original sharing interface (for example, an album interface, a file management interface, etc.).

In some embodiments, if the user finishes the sharing in the n-th target application and the n-th target application has a callback behavior, regardless of whether the callback behavior is to return to the original sharing interface (user interface) or return to the application interface corresponding to the n-th target application, the terminal could intercept the callback behavior corresponding to the n-th target application, automatically close the n-th target sharing window, and display the sharing end page.

Figure 9:
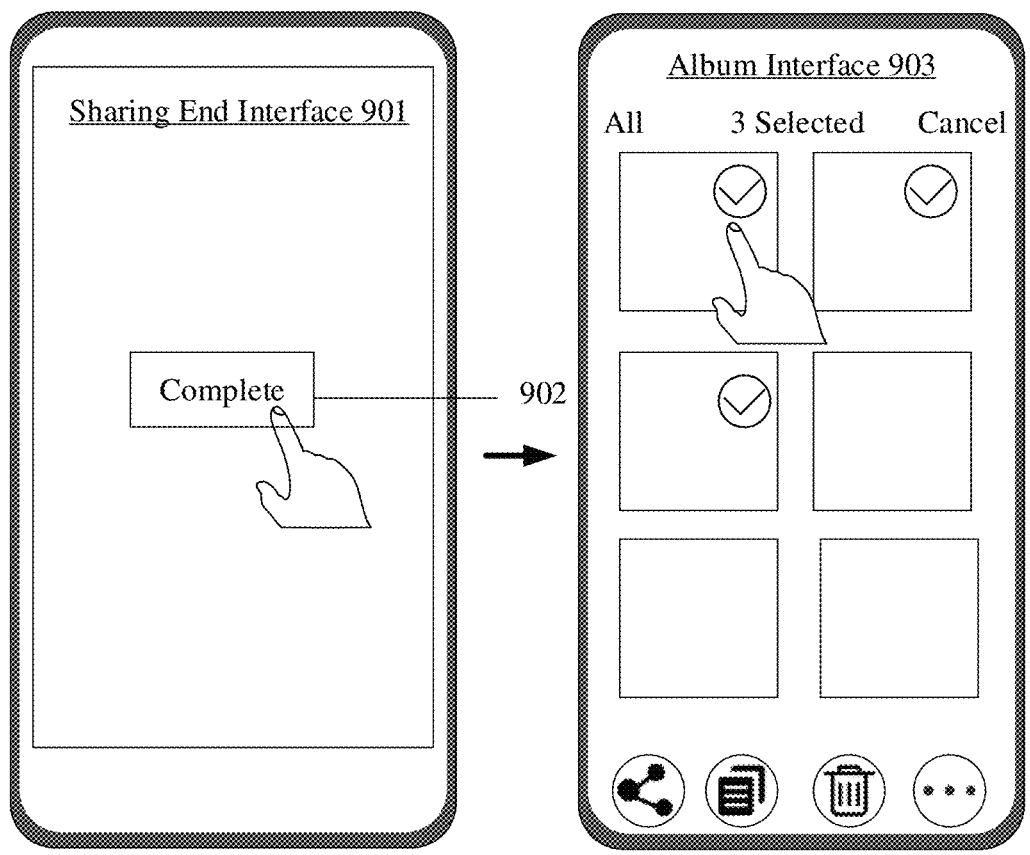
FIG. 9 is a schematic diagram showing a process of returning to a user interface after sharing is completed in an embodiment of the present application.

Schematically, as shown in FIG. 9, after the terminal identifies that the target content is shared to the n-th target application, the terminal could automatically close the n-th sharing window and display the sharing end interface 901, wherein a completion control 902 is set in the sharing end interface 901.

At block 802, in response to a trigger operation to the completion control, a sharing end interface is stopped being displayed, and the user interface is displayed.

In a possible implementation manner, the sharing end interface includes a completion control, and the user can click the completion control. When the terminal receives the click operation to the completion control, the terminal stops displaying the sharing end interface and returns to the user interface.

Illustratively, as shown in FIG. 9, after the user clicks the completion control 902, the terminal receives the trigger operation to the completion control 902, and then the terminal displays the album interface 903 and returns to the original sharing interface.

In the embodiment, after the terminal identifies that the target content is shared to the n-th target application, the terminal could display the sharing end interface to remind the user that the sharing operation is completed, and the user could click the completion control in the sharing end interface to one-key return the original sharing interface (that's, user interface).

Since it takes up a certain amount of memory to invoke multiple target applications at the same time, in order to avoid the phenomenon of terminal jams caused by invoking too many target applications at a time, in a possible implementation manner, set an upper limit or threshold of the sharing number, that's, the terminal only allows to invoke the target applications corresponding to the upper limit of the sharing number at a time, so as to prevent the phenomenon that the terminal is stuck or crashed due to that too many target applications are invoked at the same time.

Figure 10:
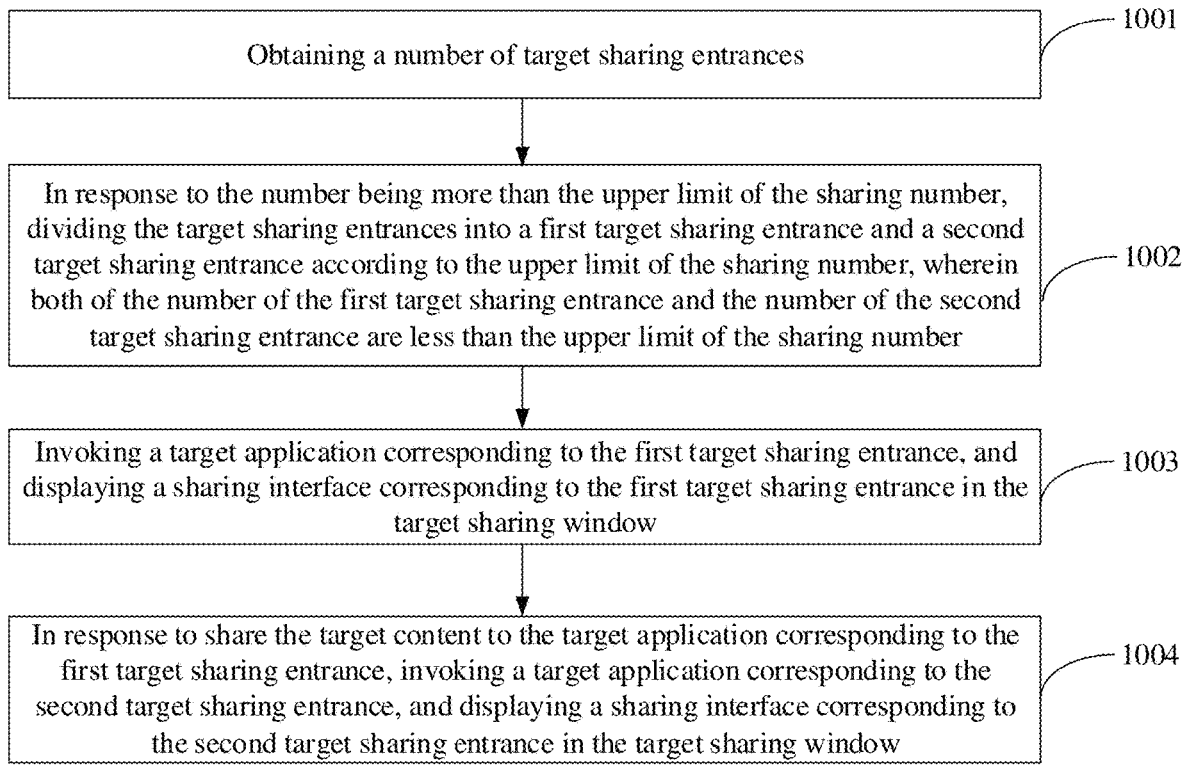
FIG. 10 is a flowchart of a process of invoking a target application in an embodiment of the present application.

Schematically, as shown in FIG. 10, it shows a flowchart of invoking a target application in an embodiment of the present application. The embodiment of the present application takes the method applied to a terminal as an example for description. The method includes:

At block 1001, a number of target sharing entrances is obtained.

In a possible implementation manner, after the terminal receives the selection operation of the sharing entrances and determines n target sharing entrances, the terminal could obtain the number of the target sharing entrances, for example, the number of target entrances is 5.

At block 1002, in response to the number being more than the upper limit of the sharing number, the target sharing entrances are divided into a first target sharing entrance and a second target sharing entrance according to the upper limit of the sharing number, wherein both of the number of the first target sharing entrance and the number of the second target sharing entrance are less than the upper limit of the sharing number.

Wherein, the upper limit of the sharing number may be a fixed value, which may be preset by the developer or customized by the user. For example, the upper limit of the sharing number is 6.

In a possible implementation manner, after the terminal obtains the number of target sharing entrances, the terminal compares the number with the upper limit of the sharing number. If the number of target sharing entrances is more than the upper limit of the sharing number, for example, the number of target sharing entrances is 8, which means that the performance of the terminal will affected if 8 target applications are invoked at the same time. Therefore, the target applications need to be invoked in batches, that's, the target sharing entrances are divided into the first target sharing entrance and the second target sharing entrance according to the upper limit of the sharing number, so that the number of each batch of the target sharing entrances is less than the upper limit of the sharing number. For example, 8 target sharing entrances are divided into a first target sharing entrance (including 4 target sharing entrances) and a second target sharing entrance (including 4 target sharing entrances).

In some embodiments, if the number of target sharing entrances is much more than the upper limit of the sharing number, the target sharing entrances could be divided into three batches for separate invocation or four batches for separate invocation, etc. The embodiment of the present application does not constitute a limitation.

In some embodiments, if the number of target sharing entrances is less than the upper limit of the sharing number, the terminal could directly invoke the corresponding target applications.

In some embodiments, in order to prevent the user from selecting too many sharing entrances at a time, in a possible implementation manner, when the terminal determines that the sharing entrances selected by the user exceeds the upper limit of the sharing number, the terminal could display a prompt message to remind the user that there is a sharing upper limit at a time. In some embodiments, when the sharing entrances selected by the user exceeds the upper limit of the sharing number, other unselected sharing entrances may be set to a non-selectable state, so as to remind the user that there is a sharing upper limit at a time.

In some embodiments, the upper limit of the sharing number could be a fixed value, or could change with the current running status of the terminal. For example, if the terminal does not run other applications in the current background and the running status is better, the upper limit of the sharing number could be set more, for example, 8, if the terminal runs many applications in the current background, the upper limit of the sharing number could be set less, for example, 3.

At block 1003, a target application corresponding to the first target sharing entrance is invoked, and a sharing interface corresponding to the first target sharing entrance is displayed in the target sharing window.

In a possible implementation manner, after the terminal determines the first target sharing entrance and the second target sharing entrance, the terminal could firstly invoke the target application corresponding to the first target sharing entrance, and displays the sharing interface corresponding to the first target sharing entrance in the target sharing window.

For the specific invoking and displaying manner of this block, reference may be made to the above embodiment, and this embodiment will not be repeated here.

In some embodiments, when the terminal invokes the target application corresponding to the first target sharing entrance, the sharing window corresponding to the second target sharing entrance can also be displayed, but the corresponding sharing interface is not displayed in the sharing window (that's a blank page), that is, the terminal will not invoke the target application corresponding to the second target sharing entrance, and due to the stacked display mode, the user cannot view the displaying content of other sharing windows except the first sharing window. Therefore, the user will not notice that the terminal only invokes the application corresponding to the first target sharing entrance, and all target sharing entrances could be invoked seamlessly.

At block 1004, in response to share the target content to the target application corresponding to the first target sharing entrance, a target application corresponding to the second target sharing entrance is invoked, and a sharing interface corresponding to the second target sharing entrance is displayed in the target sharing window.

In a possible implementation manner, after the terminal identifies that the target content is shared to the target application corresponding to the first target sharing entrance, the terminal could invoke the target application corresponding to the second target sharing entrance, and display the sharing interface corresponding to the second target entrance in the target sharing window.

In some embodiments, after the user completes the sharing operation in the target sharing window corresponding to the first one of the target sharing entrance, the terminal invokes the target application corresponding to the first one of the second target sharing entrance. Illustratively, the target applications corresponding to the first target sharing entrance are respectively a target application A, a target application B, a target application C, and a target application D. The target applications corresponding to the second target sharing entrance are respectively a target application E, a target application F, a target application G, and a target application H. Then, after identifying that the target content is shared to the target application A, the terminal invokes the target application E.

In some embodiments, after the target content is shared to the target applications corresponding to all of the first target sharing entrance, that is, after the user completes the sharing operation in the sharing window corresponding to the last one of the first target sharing entrance, the terminal invokes the target application corresponding to the second target sharing entrance. For example, after identifying that the target content is shared to the target application A, the target application B, the target application C, and the target application D, the terminal invokes the target application E, the target application F, the target application G, and the target application H.

This embodiment, by setting an upper limit of the sharing number, could prevent the user from selecting too many target sharing entrances at a time, and prevent the situation of terminal jams caused by invoking too many target applications at a time which affects the performance of the terminal. The target sharing entrance could be divided based on the upper limit of the sharing number, realizing to invoke the target application in batches, and relieve the terminal's pressure caused by invoking multiple applications.

In a possible implementation manner, since invoking an application is related to the memory space of the terminal, in a possible implementation manner, the upper limit of the sharing number can be determined according to the current memory space of the terminal.

Illustratively, the manner of determining the sharing number may include the following steps.

1. Obtaining the current remaining memory space.

In a possible implementation manner, before determining the number of target sharing entrances, the terminal may firstly obtain the current remaining memory space, so as to dynamically adjust the upper limit of the sharing number according to the current remaining memory space.

2. Determining the upper limit of the sharing number according to the current remaining memory space.

Wherein, the upper limit of the sharing number is positively correlated with the current remaining memory space. That is, the smaller the current remaining memory space, the less the upper limit of the sharing number. For example, if the current remaining memory space is 700 MB, the corresponding upper limit of the sharing number can be 6; if the current remaining memory space is 400 MB, the corresponding upper limit of the sharing number can be 4.

In a possible implementation manner, the terminal may be preset with a corresponding relationship table between the remaining memory space and the upper limit of the sharing number. After obtaining the current remaining memory space, the terminal could search the relationship table according to the current remaining memory space, to determine the current upper limit of the sharing number for a subsequent judgment operation.

Schematically, the correspondence table between the remaining memory space and the upper limit of the sharing number can be as shown in Table 1:

TABLE I

| current remaining memory space/MB | 0-200 | 200-400 | 400-600 | 600-700 | ... |
|---|---|---|---|---|---|
| the upper limit of the sharing number/pc | 2 | 4 | 6 | 8 | ... |

It can be concluded from Table 1 that when determining the remaining memory space of the terminal is 400-600 MB, the terminal could determine that the corresponding upper limit of the sharing number is 6.

In this embodiment, by pre-setting the correspondence table of the remaining memory space and the upper limit of the sharing number, when the terminal obtains the current remaining memory space, it can find the corresponding upper limit of the sharing number from the correspondence table according to the current remaining memory space, thereby dynamically determining the upper limit of the sharing number which meets the current operating condition of the terminal, so as to avoid invoking too many applications to effect the normal operation of the terminal when the remaining memory of the terminal is less, thereby ensuring the operating performance of the terminal.

Since the data amount corresponding to the target content will affect the rate of uploading or sharing, if the data amount of the target content is large, it may take a long time for a single upload or sharing. Since the user could continue the sharing operation in the second target sharing window only after the user completes the sharing operation in the first target sharing window, which will cause the time interval between the two sharing operations to be too long, resulting that the entire sharing operation takes too long time, and reducing the sharing efficiency. In order to minimize the time required for multiple uploads or shares and to increase the efficiency of the sharing operation, therefore, in a possible implementation manner, a data amount threshold is set. If the data amount of the target content is greater than the data amount threshold, multiple sharing operations could be performed in multiple sharing window interfaces at the same time.

Illustratively, the method for realizing the foregoing sharing operation may include the following steps:

1. Obtaining the data amount of the target content.

In a possible implementation manner, after the user selects the target content in the user interface, the terminal obtains the data amount corresponding to the target content, for example, the data amount of the target content is 100 MB.

2. In response to the data amount being greater than the data amount threshold, simultaneously receiving the sharing operation in the n target sharing windows.

The data amount threshold may be preset by the developer, and the data amount threshold is determined by the developer by evaluating the upload time or sharing time of the target content with different data amount. For example, the data amount threshold is 200 MB.

In a possible implementation manner, after obtaining the data amount of the target content, the terminal compares the data amount with a preset threshold of the data amount. If the data amount is more than the data amount threshold, for example, the data amount of the target content is 250 MB, which means that it will take a long time to share all the target content at once. In order to improve the efficiency of multiple sharing, the user could perform sharing operations in multiple target sharing windows at the same time, that is, the terminal could receive the sharing operations in the n target sharing windows at the same time, realizing the simultaneous sharing of target content to multiple target applications.

In some embodiments, if the data amount corresponding to the target content is less than the data amount threshold, the terminal could also receive the sharing operations in the n target sharing windows at the same time to further improve the sharing efficiency; or the terminal could receive the sharing operations in the n target sharing windows in sequence according to the order of the sharing windows. This embodiment does not limit the receiving of the sharing operations.

In this embodiment, the data amount threshold is set. When the data amount of the target content obtained by the terminal is more than the data amount threshold, the terminal could receive the sharing operations in the n target sharing windows at the same time, so that multiple sharing operations can be performed at the same time, thereby reducing the length of the interval between two sharing operations, and improving the efficiency of the whole sharing operation.

In a possible implementation manner, since displaying the target sharing windows corresponding to the target sharing entrances at the same time also needs to occupy the memory of the terminal, if the terminal does not receive the user's sharing operation in each target sharing window for a long time, it will result in a waste of power consumption and memory space of the terminal. In order to avoid the waste of power consumption and memory space of the terminal, therefore, in a possible implementation manner, a timer can be set for the target sharing window interface, so that after the timer reaches a timer duration and the terminal does not receive the sharing operation of the user, the terminal could close the target sharing window.

In a possible implementation manner, the above method for closing the target sharing window may include the following steps:

1. Setting a timer for the n target sharing windows.

In a possible implementation manner, after the terminal displays the n target sharing windows corresponding to the n target sharing entrances, a timer can be set for the n target sharing windows.

In some embodiments, a same timer can be set for the n target sharing windows, for example, the timer duration set for each of the n target sharing windows is 10 minutes.

In some embodiments, different timers can be set according to the sorting of the n target sharing windows, and the duration of the timer is positively related to the sorting, for example, if the timer duration corresponding to the first target sharing window is 5 minutes, the timer duration corresponding to the second target sharing window could be 7 minutes, and so on, setting timers for the n target sharing windows respectively.

2. in response to the reaching of the timer duration and not receiving of the sharing operation in the target sharing window, closing the n target sharing windows.

In a possible implementation manner, after the terminal identifies that the timer reaches the timer duration, and does not receive the sharing operation in the target sharing window, in order to avoid the waste of power consumption and memory space of the terminal by invoking the target application all the time, the terminal could automatically close the target sharing window.

In some embodiments, if different timers are set for each target sharing window, after one timer reaches the timer duration and the terminal does not receive the sharing operation in the target sharing window corresponding to the timer, the terminal could only turn off the timer corresponding the target sharing window. For example, if the timer corresponding to the second target sharing window reaches the timer duration, and the terminal does not receive the sharing operation in the second target sharing window, the terminal could turn off the second target sharing window.

In this embodiment, by setting the timer for the target sharing window, after the timer reaches the timer duration and the terminal does not receive the sharing operation in the target sharing window, the terminal could turn off the target sharing window in time to avoid the occupation of the memory space of the terminal caused by continuous invoking of the target application and the waste of power consumption of terminal caused by continuous displaying the target sharing window.

Figure 11:
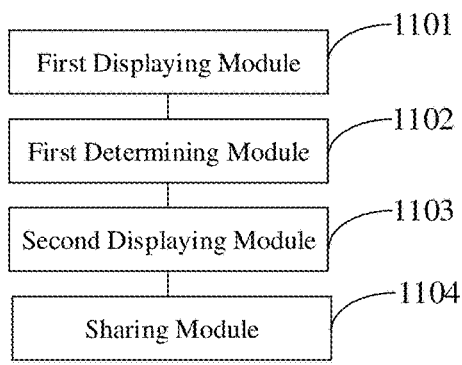
FIG. 11 shows a structural block diagram of a content sharing device provided by an embodiment of the present application.

Please refer to FIG. 11, which shows a structural block diagram of a content sharing device provided by an embodiment of the present application. The device can be implemented as all or a part of the terminal through software, hardware or a combination of the two. The device includes a first displaying module 1101, a first determining module 1102, a second displaying module 1103 and a sharing module 1104.

The first displaying module 1101 is configured to display a sharing trigger page in a user interface in response to a sharing trigger operation to a target content in the user interface, wherein the sharing trigger page includes at least one sharing entrance, and the sharing entrance is configured to invoke an application for a content sharing.

The first determining module 1102 is configured to determine n target sharing entrances in response to a selection operation to the sharing entrance, wherein n is an integer greater than or equal to 2.

The second displaying module 1103 is configured to display n target sharing windows corresponding to the n target sharing entrances.

The sharing module 1104 is configured to share the target content to a target application in response to a sharing operation received in the target sharing window.

In some embodiments, the second displaying module 1103 includes a determining unit and an invoking unit.

The determining unit is configured to determine target applications corresponding to each of the n target sharing entrances, wherein different sharing entrances correspond to different applications, or different sharing entrances correspond to different sharing interfaces of the same application.

The invoking unit is configured to invoke a target application and display a sharing interface corresponding to the target sharing entrance in the target sharing window, and the display mode of the n target sharing windows includes a tiled display or a stacked display.

In some embodiments, the n target sharing windows are displayed in a stack, and the periphery of the target sharing window includes a jump control.

In some embodiments, the sharing module 1104 includes a sharing unit, an obtaining unit, a first displaying unit and a second displaying unit.

The sharing unit is configured to share the target content to a k-th target application in response to a k-th sharing operation in a k-th target sharing window, wherein k is an integer greater than or equal to 1 and less than or equal to n−1.

The obtaining unit is configured to obtain a callback application interface corresponding to the k-th target application, wherein the callback application interface is configured to indicate an application interface that the k-th target application calls back after the content sharing for the k-th target application is completed.

The first displaying unit is configured to automatically close the k-th target sharing window and display the k+1-th target sharing window in response to the callback application interface being a user interface.

The second displaying unit is configured to display the callback application interface in the k-th target window interface in response to the callback application interface being an application interface corresponding to the k-th target application; configured to close the k-th target sharing window and display the k+1-th target sharing window in response to a trigger operation of a jump control.

In some embodiments, the device further includes a third displaying module and a fourth displaying module.

The third displaying module is configured to automatically close the n-th target sharing window and display a sharing end interface in response to sharing the target content to the n-th target application, wherein the sharing end interface including a completion control.

The fourth displaying module is configured to stop displaying a sharing end interface and display a user interface in response to a trigger operation to the completion control.

In some embodiments, the sharing trigger page includes a multi-application sharing entry control.

In some embodiments, the device further includes a switching module.

The switching module is configured to switch a single-application sharing function to a multi-application sharing function in response to a trigger operation to the multi-application sharing entry control in the sharing trigger page.

In some embodiments, the invoking unit is further configured to:

acquire the number of the target sharing entrance;

divide the target sharing entrances into a first target sharing entrance and a second target sharing entrance according to the upper limit of the sharing number in response to the number being more than the upper limit of the sharing number, wherein both of the number of the first target sharing entrance and the number of the second target sharing entrance are less than the upper limit of the sharing number;

invoke a target application corresponding to the first target sharing entrance and display a sharing interface corresponding to the first target sharing entrance in the target sharing window; and invoke a target application corresponding to the second target sharing entrance and display a sharing interface corresponding to the second target sharing entrance in the target sharing window in response to sharing the target content to the target application corresponding to the first target sharing entrance.

In some embodiments, the device further includes a first obtaining module and a second determining module.

The first obtaining module is configured to obtain the current remaining memory space.

The second determining module is configured to determine the upper limit of the sharing number according to the current remaining memory space, wherein the upper limit of the sharing number of shares is positively correlated with the current remaining memory space.

In some embodiments, the device further includes a second obtaining module and a receiving module.

The second obtaining module is configured to obtaining the data amount of the target content.

The receiving module is configured to simultaneously receive the sharing operation in the n target sharing windows in response to the data amount being greater than the data amount threshold.

In some embodiments, the device further includes a setting module and a closing module.

The setting module is configured to set a timer for the n target sharing windows.

The closing module is configured to close the n target sharing windows in response to the reaching of the timer duration and not receiving of the sharing operation in the target sharing window.

In the embodiments of the present application, when the terminal receives a sharing trigger operation to the target content in the user interface, the terminal could display a sharing trigger page in the user interface (the sharing trigger page includes at least one sharing entrance). The user could select multiple sharing entrances in the sharing trigger page at the same time. The terminal receives the selection operation to the sharing entrances, determining the n target sharing entrances, thereby displaying n target sharing windows corresponding to the n target sharing entrances, so that the user can perform sharing operation in each target sharing window, thereby sharing the target content to multiple target applications at the same time. Since the user can select multiple target sharing entrances in the sharing trigger page at the same time, and the terminal could invoke the target sharing windows corresponding to multiple target sharing entrances at the same time, therefore, the user could share the same target content to multiple target applications through a single sharing trigger operation. Compared with the relevant art, in which the user could only share the target content to one single application through a single target application, the content sharing method provided in the embodiments of the present application can simplify the flow of the sharing operation and improve the efficiency of the sharing operation.

Figure 12:
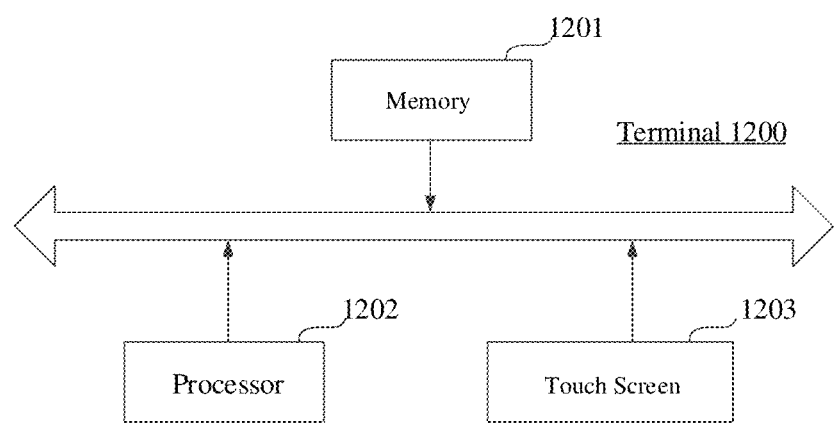
FIG. 12 shows a structural block diagram of a terminal provided by an embodiment of the present application.

Please refer to FIG. 12, which shows a structural block diagram of a terminal 1200 according to an embodiment of the present application. The terminal 1200 could be an electronic device with an application installed and running, such as a smart phone, a tablet computer, an e-book, or a portable personal computer. The terminal 1200 in the present application may include one or more of the following components: a processor 1202, a memory 1201, and a touch screen 1203.

The processor 1202 may include one or more processing cores. The processor 1102 connects various parts of the entire terminal 1200 through various entrances and lines, and executes various functions and processes data of the terminal 1200 by running or executing instructions, programs, code sets, or instruction sets stored in the memory 1201, and invoking data stored in the memory 1201. In some embodiments, the processor 1202 may implement by at least one hardware form of a digital signal processing (DSP), a field-programmable gate array (FPGA), and a programmable logic array (PLA). The processor 1202 may integrate one or a combination of a CPU, a GPU, a modem, and the like. Wherein, the CPU mainly processes an operating system, a user interface, and an application program. The GPU is configured to render and draw the content that needs to be displayed in the touch screen 1203. The modem is configured to process wireless communication. It can be understood that the above-mentioned modem may not be integrated into the processor 1202, but may be implemented by a communication chip alone.

The memory 1201 may include a random-access memory (RAM) or a read-only memory (ROM). In some embodiments, the memory 1201 includes a non-transitory computer-readable storage medium. The memory 1201 may be configured to store instructions, programs, codes, code sets or instruction sets. The memory 1201 may include an area for storing program and an area for storing data, wherein, the area for storing program may store instructions for implementing the operating system, instructions for implementing at least one function (such as a touch function, a sound playback function, an image playback function, etc.), instructions for implementing the embodiments of the foregoing various method, etc. The operating system may be the Android system (including a system developed in-depth based on the Android system), the IOS system developed by Apple (including a system developed in-depth based on the IOS system) or other systems. The area for storing data can store data (such as a phone book, an audio and video data, and a chat record data) created during the use of the terminal 1200 and the like.

The touch screen 1203 is configured to receive the user's touch operation on or near thereof by any suitable object such as a finger, a touch pen, etc., and to display the user interface of each application program. The touch screen 1203 is usually arranged on the front panel of the terminal 1200. The touch screen 1203 can be designed as a full screen, a curved screen or a special-shaped screen. The touch display screen 1203 can also be designed as a combination of a full screen and a curved screen, or a combination of a special-shaped screen and a curved screen, which is not limited in the embodiments of the present application.

In addition, those skilled in the art can understand that the structure of the terminal 1200 shown in the above drawings does not constitute a limitation to the terminal 1200, and the terminal may include more or less components than those shown in the figure, or a combination of some components, or a different component arrangement. For example, the terminal 1200 also includes a component such as a radio frequency circuit, a photographing component, a sensor, an audio circuit, a wireless fidelity (WiFi) component, a power supply, a Bluetooth component, etc., which will not be repeated here.

The embodiments of the present application also provide a computer-readable medium that stores at least one instruction, and the at least one instruction is loaded and executed by the processor to implement the content sharing method described in each of the above embodiments.

According to one aspect of the present application, a computer program product or computer program is provided. The computer program product or computer program includes computer instructions, and the computer instructions are stored in a computer-readable storage medium. The processor of the terminal reads the computer instructions from the computer-readable storage medium, and executes the computer instructions, so that the terminal could execute the content sharing method provided in the various optional implementation manners of the foregoing aspects.

Those skilled in the art should be aware that, in one or more of the foregoing examples, the functions described in the embodiments of the present application may be implemented by hardware, software, firmware, or any combination thereof. When implemented by software, these functions can be stored in a computer-readable medium or transmitted as one or more instructions or codes in the computer-readable medium. The computer-readable medium includes a computer storage medium and a communication medium, wherein the communication medium includes any medium that facilitates the transfer of a computer program from one position to another. The storage medium may be any available medium that can be accessed by a general-purpose or dedicated computer.

The above are only optional embodiments of the present application and are not intended to limit the present application. Any modification, equivalent replacement, or improvement, etc. made within the spirit and principle of the present application shall be fall into the protection scope of the present application.

What is claimed is:

1. A content sharing method, comprising:
    in response to a sharing trigger operation to a target content in a user interface of a display device, displaying a sharing trigger page in the user interface, wherein the sharing trigger page comprises at least one sharing entrance that is configured to invoke an application for content sharing;
    in response to a selection operation to the sharing entrance, determining n target sharing entrances, wherein n is an integer greater than or equal to 2;
    determining one or more target applications corresponding to each of the n target sharing entrances, wherein different sharing entrances correspond to different applications or to different sharing interfaces of a same application;
    obtaining a number of the target sharing entrances;
    in response to the number being more than an upper limit of a sharing number, dividing the n target sharing entrances into a first target sharing entrance and a second target sharing entrance according to the upper limit of the sharing number, wherein both of the number of the first target sharing entrance and the number of the second target sharing entrance are less than the upper limit of the sharing number;
    invoking a target application corresponding to the first target sharing entrance, and displaying a sharing interface corresponding to the first target sharing entrance in a target sharing window; and
    in response to sharing the target content to the target application corresponding to the first target sharing entrance, invoking a target application corresponding to the second target sharing entrance, and displaying a sharing interface corresponding to the second target sharing entrance in a target sharing window, wherein a display mode of the n target sharing windows comprises a tiled display or a stacked display; and
    in response to a sharing operation received in at least one of the n target sharing windows, sharing the target content to a target application.

2. The method according to claim 1, wherein the n target sharing windows are displayed in a stack form, and a peripheral side of the target sharing window comprises a jump control;
    wherein the sharing the target content to a target application comprises:
    in response to a k-th sharing operation in a k-th target sharing window, sharing the target content to a k-th target application, wherein k is an integer greater than or equal to 1 and less than or equal to n−1;
    obtaining a callback application interface corresponding to the k-th target application, wherein the callback application interface is configured to indicate an application interface that the k-th target application calls back after the content sharing for the k-th target application is completed;
    in response to the callback application interface being the user interface, automatically closing the k-th target sharing window, and displaying a k+1-th target sharing window;
    in response to the callback application interface being an application interface corresponding to the k-th target application, displaying the callback application interface in the k-th target window; and
    in response to a trigger operation to the jump control, closing the k-th target sharing window, and displaying the k+1-th target sharing window.

3. The method according to claim 2, wherein after the in response to a sharing operation received in at least one of the n target sharing windows, sharing the target content to a target application, the method further comprises:
    in response to sharing the target content to an n-th target application, automatically closing an n-th target sharing window, and displaying a sharing end interface, wherein the sharing end interface comprises a completion control; and
    in response to a trigger operation to the completion control, stopping displaying the sharing end interface, and displaying the user interface.

4. The method according to claim 1, wherein the method further comprises:
    obtaining a current remaining memory space; and
    determining the upper limit of the sharing number according to the current remaining memory space, wherein the upper limit of the sharing number is positively correlated with the current remaining memory space.

5. The method according to claim 4, wherein the method further comprises:
presetting a corresponding relationship table between the remaining memory space and the upper limit of the sharing number;
wherein the determining the upper limit of the sharing number according to the current remaining memory space comprises:
searching the corresponding relationship table according to the current remaining memory space and determining a current upper limit of the sharing number.

6. The method according to claim 1, wherein the invoking the target application and the displaying the sharing interface comprises:
invoking the target application corresponding to the first target sharing entrance, and displaying the sharing interface corresponding to the first target sharing entrance in the target sharing window, and displaying a blank page in a sharing window corresponding to the second target sharing entrance.

7. The method according to claim 1, wherein the sharing trigger page comprises a multi-application sharing entry control;
before the in response to a selection operation to the sharing entrance, determining n target sharing entrances, the method further comprises:
in response to a trigger operation to the multi-application sharing entry control in the sharing trigger page, switching a single-application sharing function to a multi-application sharing function.

8. The method according to claim 1, wherein the method further comprises:
obtaining a data amount of the target content; and
in response to the data amount being more than a data amount threshold, simultaneously receiving the sharing operation in the n target sharing windows.

9. The method according to claim 1, wherein after the displaying n target sharing windows corresponding to the n target sharing entrances, the method further comprises:
setting a timer for the n target sharing windows; and
in response to the timer reaching a timer duration and not receiving the sharing operation in the n target sharing windows, closing the n target sharing windows.

10. The method according to claim 9, wherein the setting a timer for the n target sharing windows, comprises:
setting multiple timers for the n target sharing windows respectively, wherein a time duration of the timer is positively related to a sorting of the n target sharing windows;
wherein the closing the n target sharing windows comprises:
in response to at least one of the multiple timers reaching the timer duration and not receiving the sharing operation in a target sharing window corresponding to the at least one of the multiple timers, closing the target sharing window.

11. The method according to claim 1, wherein the method further comprises:
obtaining a data amount of the target content; and
in response to the data amount being less than a data amount threshold, receiving the sharing operations in the n target sharing windows in sequence according to an order of the n target sharing windows.

12. A terminal, comprising a processor and a memory; the memory is configured to store at least one instruction, and the processor is configured to execute at least one instruction to:
display a sharing trigger page in a user interface of a display device in response to a sharing trigger operation to a target content in the user interface, wherein the sharing trigger page comprises at least one sharing entrance, and the sharing entrance is configured to invoke an application for content sharing;
determine one or more target applications corresponding to each of the n target sharing entrances, wherein different sharing entrances correspond to different applications or to different sharing interfaces of a same application;
obtain a number of the target sharing entrances;
in response to the number being more than an upper limit of a sharing number, divide the n target sharing entrances into a first target sharing entrance and a second target sharing entrance according to the upper limit of the sharing number, wherein both of the number of the first target sharing entrance and the number of the second target sharing entrance are less than the upper limit of the sharing number;
invoke a target application corresponding to the first target sharing entrance, and display a sharing interface corresponding to the first target sharing entrance in a target sharing window;
in response to sharing the target content to the target application corresponding to the first target sharing entrance, invoke a target application corresponding to the second target sharing entrance, and display a sharing interface corresponding to the second target sharing entrance in a target sharing window, wherein a display mode of the n target sharing windows comprises a tiled display or a stacked display; and
share the target content to a target application in response to a sharing operation received in at least one of the n target sharing windows.

13. The terminal according to claim 12, wherein the n target sharing windows are displayed in a stack form, and the peripheral side of the target sharing window comprises a jump control;
wherein the share the target content to a target application comprises:
share the target content to a k-th target application in response to a k-th sharing operation in a k-th target sharing window, wherein k is an integer greater than or equal to 1 and less than or equal to n−1;
obtain a callback application interface corresponding to the k-th target application, wherein the callback application interface is configured to indicate an application interface that the k-th target application calls back after the content sharing for the k-th target application is completed;
automatically close the k-th target sharing window and display the k+1-th target sharing window in response to the callback application interface being the user interface; and
display the callback application interface in the k-th target window in response to the callback application interface being an application interface corresponding to the k-th target application; close the k-th target sharing window, and display the k+1-th target sharing window in response to a trigger operation to the jump control.

14. The terminal according to claim 13, wherein the processor is further configured to execute at least one instruction to:
automatically close an n-th target sharing window and display a sharing end interface in response to sharing the target content to the n-th target application, wherein the sharing end interface comprises a completion control; and stop displaying the sharing end interface and display the user interface in response to a trigger operation to the completion control.

15. The terminal according to claim 12, wherein the sharing trigger page comprises a multi-application sharing entry control;

wherein the processor is further configured to execute at least one instruction to:

in response to a trigger operation to the multi-application sharing entry control in the sharing trigger page, switch a single-application sharing function to a multi-application sharing function.

16. A non-transitory computer-readable storage medium, storing at least one instruction, and the at least one instruction is configured to be executed by a processor to implement:

in response to a sharing trigger operation to a target content in a user interface of a display device, displaying a sharing trigger page in the user interface, wherein the sharing trigger page comprises at least one sharing entrance that is configured to invoke an application for content sharing;

determining one or more target applications corresponding to each of the n target sharing entrances, wherein different sharing entrances correspond to different applications or to different sharing interfaces of a same application;

obtaining a number of the target sharing entrances;

in response to the number being more than an upper limit of a sharing number, dividing the n target sharing entrances into a first target sharing entrance and a second target sharing entrance according to the upper limit of the sharing number, wherein both of the number of the first target sharing entrance and the number of the second target sharing entrance are less than the upper limit of the sharing number;

invoking a target application corresponding to the first target sharing entrance, and displaying a sharing interface corresponding to the first target sharing entrance in a target sharing window;

in response to sharing the target content to the target application corresponding to the first target sharing entrance, invoking a target application corresponding to the second target sharing entrance, and displaying a sharing interface corresponding to the second target sharing entrance in a target sharing window, wherein a display mode of the n target sharing windows comprises a tiled display or a stacked display; and in response to a sharing operation received in at least one of the n target sharing windows, sharing the target content to a target application.

* * * * *